June 19, 1923.
A. DE KHOTINSKY
ELECTRIC HEATER
Filed Aug. 15, 1921
1,459,049
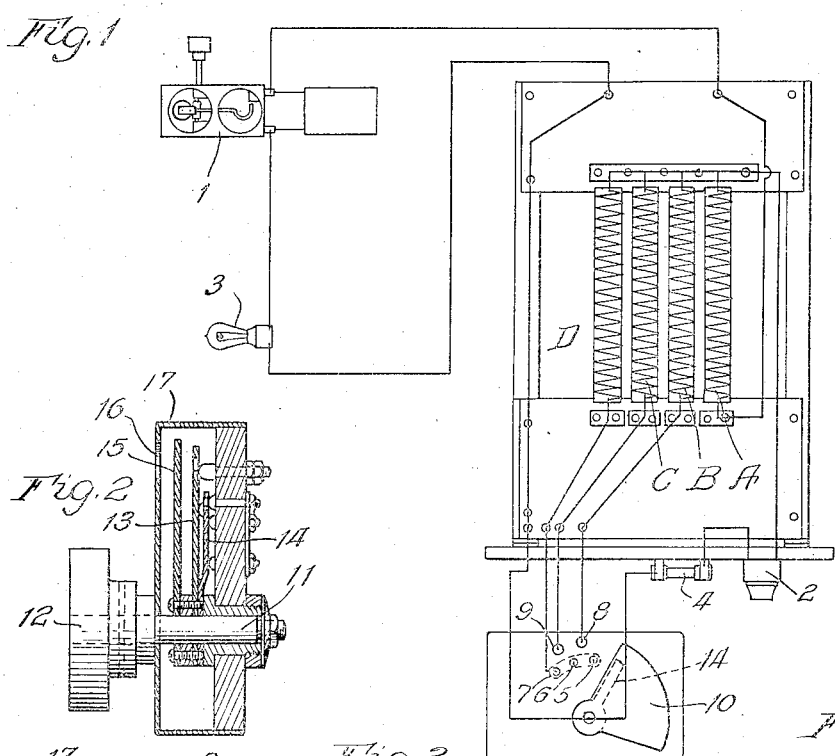
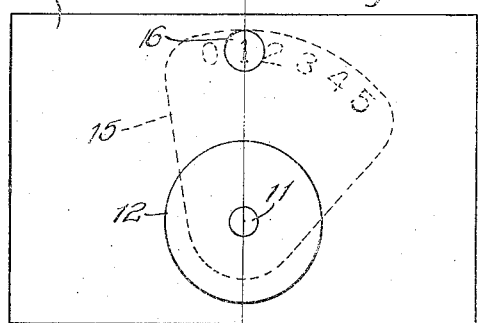
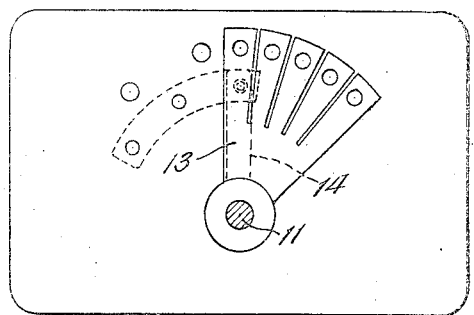
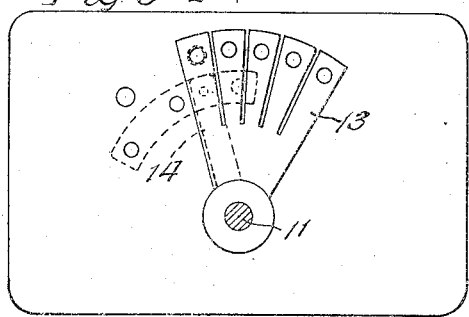
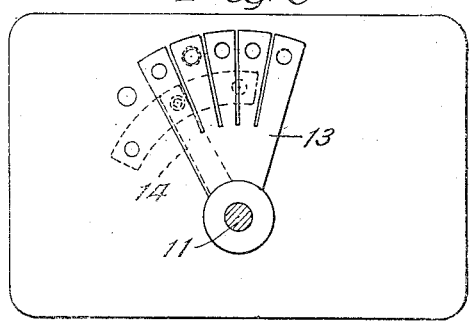
Inventor:
Achilles de Khotinsky
By Wm. O. Bell, Atty.

Patented June 19, 1923.

1,459,049

UNITED STATES PATENT OFFICE.

ACHILLES DE KHOTINSKY, OF CHICAGO, ILLINOIS, ASSIGNOR TO CENTRAL SCIENTIFIC COMPANY, OF CHICAGO, ILLINOIS, A CORPORATION OF ILLINOIS.

ELECTRIC HEATER.

Application filed August 15, 1921. Serial No. 492,224.

*To all whom it may concern:*

Be it known that I, ACHILLES DE KHOTINSKY, a citizen of the United States, residing at Chicago, in the county of Cook and State of Illinois, have invented certain new and useful Improvements in Electric Heaters, of which the following is a specification.

As commonly constructed constant temperature electric heaters are provided with a heating element of sufficient wattage to produce a higher temperature under the most adverse conditions than is necessary for the particular result desired, and are equipped with a thermosensitive device for opening the circuit when the desired temperature is exceeded and closing it again when the heater drops below that temperature. These organizations always have a certain lag which results in a continuously varying temperature that vacillates above and below the desired constant. If the time units are plotted as abscissas and temperatures as ordinates, the result is a periodic curve in which the amplitude is an approximate measure of the variation.

The object of this invention is to make this curve more closely approximate a straight line than has heretofore been attained.

More specifically the object is to produce a heater in which the heating element is divided into a plurality of units, only one of which will be affected by the thermo regulator, means being provided to cut in such number and assortment of units as may be required to produce the desired temperature under specific conditions.

A further object is to provide such an assortment of units that with given average conditions proper wattage can be cut in to bring the prescribed constant temperature approximately at the middle of the zone of temperature controlled by the automatically regulated unit.

In the accompanying drawing I have shown one embodiment in which the heating element is composed of a plurality of units all except one of which are preferably though not necessarily of equal wattage and that one is substantially though not necessarily the half wattage of the others. The number of constant temperatures and the maximum and minimum constant temperature to be produced in a particular heater will determine the number and capacity of the units. One of the larger units only is in circuit with the thermosensitive control and the others may be connected in parallel by a switch that will first cut in the half or smaller unit then cut it out and cut in a larger unit, then cut in the smaller unit again. then cut it out again and cut in another larger unit and so on until all the units are in operation.

In the drawing—

Fig. 1 is a diagrammatic view showing the electrical circuits of one embodiment of the invention;

Fig. 2 is a vertical section of the switch and switch box;

Fig. 3 is an elevation of the switch box;

Figs. 4, 5 and 6 are views showing different positions of the switch.

Referring more particularly to Fig. 1; A, B, C, and D indicate heating units. The unit A is under control of the thermoregulator 1 and is put in operation initially by inserting the plug 2 to complete the circuit including this unit A, the thermo regulator 1, the lamp 3 and fuse 4. The unit D is the smaller unit and is connected to each of the terminals 5, 6, and 7 while units B and C are connected with the terminals 8 and 9 respectively. Adjacent to these terminals is a switch 10 including a spindle 11 journaled in suitable bearings and equipped with a knob 12 and two blades,— one of fan shape shown at 13 and the other a single, narrow strip 14. Outwardly of these blades the stem is equipped with a dial sector 15 carrying suitable numerals or other devices to indicate the units or wattage cut in by registering with an opening 16 in the cover 17 of the switch box.

When the temperature to be maintained is within the capacity of the unit A, that unit only will be used; and, when the heater rises above the desired constant temperature, the thermo-regulator will break the circuit in a well understood manner. When however it is necessary to develop a larger quantity of heat one or more of the other units are cut in by turning the knob 12 of the switch 10. By turning it slightly to the left in Fig. 1 the strip 14 engages contact 5, cutting in the small unit D. If this is insufficient further movement of the switch to the left will cause the strip 10 to pass over contact 5 and the fan shaped blade 13 to close with the contact 8 which will cut in the unit B. If this is insufficient further movement of the switch will cause the strip 14 to again cut in the small unit D by contact at 6 and so on until the entire wattage of the heater is in operation, if necessary.

Take for example a condition in which units A, B, and D are required to develop temperature slightly in excess of a desired constant. The knob 12 would be rotated until the blade 14 engages the contact 6 and the blade 13 the contact 8. Now when the temperature rises above the desired limit the thermo-regulator will cut out the unit A leaving the units B and D still in operation and when the temperature falls below the desired constant the thermo-regulator will cut unit A in again. By this means it will be seen that only a small portion of the heating element is cut out when the temperature rises beyond the desired limit and only that small portion is cut in again when the temperature of the heater drops below the desired limit. The result of this construction is that the thermoregulator is given control of a zone of temperatures only instead of the entire temperature range of the heater; and it will be clear that by cutting the small unit in or out this zone may be so placed that its middle portion will be approximately at the prescribed temperature.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. In a device of the character described, a plurality of heating units, one of which is of less wattage than the others, and means to cut in said smaller unit alternately with each of the larger units.

2. In a device of the character described, two series of contacts and a switch having means to engage all the contacts of one series and one contact of the other series.

3. In a device of the class described, two series of contacts and a switch having means to engage all of one series while engaging only one of the other series.

4. In a device of the class described, two sets of contacts, and a switch having means to engage the contacts of one set successively, and other means to engage and disengage the contacts of the other set successively.

5. In a device of the class described, two sets of contacts, and a switch having means to engage the contacts of one set successively, and other means to engage and disengage the contacts of the other set successively and alternately with the engagement of the first mentioned means with the contacts of the first set.

6. In a device of the class described, a heating unit, a second heating unit, a third heating unit, and means to cut in the third heating unit alternately with each of the first and second heating units.

7. In a device of the class described, a heating unit, a thermo regulator for controlling the heating unit, a second heating unit, a third heating unit, and means to cut in the third heating unit alternately with each of the first and second heating units.

8. In a device of the class described, a series of contacts, a second series of contacts, a switch having means to engage all the contacts of the first series while engaging one contact of the second series, a plurality of heating units each of which is associated with one of the contacts of the first series, and an additional heating unit associated with all of the contacts in the second series.

9. In a device of the class described, a series of contacts, a second series of contacts, a switch having means to engage all the contacts of the first series while engaging one contact of the second series, a plurality of heating units each of which is associated with one of the contacts of the first series, a thermo regulator for controlling one of the heating units, and an additional heating unit associated with all of the contacts in the second series.

10. In a device of the class described, a series of contacts, a second series of contacts, a switch having means to engage all the contacts of the first series while engaging only one contact of the second series, a plurality of heating units each of which is associated with one of the contacts of the first series, and an additional heating unit associated with all of the contacts of the second series.

11. In a device of the class described, a series of contacts, a second series of contacts, a switch having means to engage all the contacts of the first series while engaging only one contact of the second series, a plurality of heating units each of which is associated with one of the contacts of the first series, a thermo regulator for controlling one of the heating units, and an additional heating unit associated with all of the contacts of the second series.

12. In a device of the class described, the combination with a switch comprising a set of contacts, a second set of contacts, means to engage the contacts of the first set successively, and other means to engage and disengage the contacts of the second set successively and alternately with the engagement of the first mentioned means with the contacts of the first set, of a plurality of heating units each of which is associated with one of the contacts in the first set, and an additional heating unit associated with each of the contacts in the second set.

13. In a device of the class described, the combination with a switch comprising a set of contacts, a second set of contacts, means to engage the contacts of the first set successively, and other means to engage and disengage the contacts of the second set successively and alternately with the engagement of the first mentioned means with the contacts of the first set, of a plurality of heating units each of which is associated with one of the contacts in the first set, a thermo regulator for controlling one of the heating units, and an additional heating unit associated with each of the contacts in the second set.

ACHILLES DE KHOTINSKY.